2,895,945
ALDEHYDE POLYERYTHRITOL POLYMERS

Rudolph F. Fischer, Oakland, and Thomas F. Mika, Orinda, Calif., assignors to Shell Development Company, New York, N.Y., a corporation of Delaware No Drawing. Application July 30, 1956
Serial No. 600,719

4 Claims. (Cl. 260—67)

This invention relates to novel resins and processes for preparing the same. More particularly, it relates to novel resins which are the reaction products of aldehydes and certain polyols.

It is known that the reaction of certain aldehydes with various polyhydric alcohols such as glycols, will produce useful acetals. Such acetals can be further treated with other reactants to produce resinous products.

It has now been found that novel prepolymers having outstanding properties are obtained from the reaction products of an unsaturated aldehyde and a polypentaerythritol.

The unsaturated aldehydes that may be used in the preparation of the cyclic acetals comprise the alpha,beta-ethylenically unsaturated aldehydes, i.e., aldehydes having an ethylenic group between two carbon atoms one of which is attached to an aldehyde group

The aldehyde may be straight chain or cyclic in character and may or may not contain one or more aromatic constituents. The most desirable aldehydes for the purpose of the present invention have a terminal methylene group attached directly by a double bond to a carbon atom which in turn is attached directly to an aldehyde group as represented by the general formula

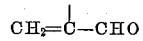

In general, aldehydes having not more than 10 carbon atoms in the molecule are preferred. Examples of suitable alpha,beta-ethylenically unsaturated aldehydes having a terminal methylene group are acrolein, methacrolein, alpha-isobutyl acrolein, alpha-n-aryl acrolein, alpha-n-hexyl acrolein, alpha-bromo acrolein, and the like. Examples of other unsaturated aldehydes that may be used include, among others, crotonaldehyde, alpha-chlorocrotonaldehyde, beta-chlorocrotonaldehyde, alpha-bromocrotonaldehyde, beta-bromocrotonaldehyde, alpha-gamma-dichlorocrotonaldehyde, alpha,beta-dimethyl acrolein, alpha-methyl-beta-ethyl acrolein, alpha-methyl-beta-isobutyl acrolein, alpha-ethyl-beta-propyl acrolein and the like.

The polypentaerythritols, which constitute the other group of reactants, are characterized by at least six hydroxy groups. However, the number may be substantially higher. Thus, for example, the polypentaerythritols may be selected from dipentaerythritol, tripentaerythritol, mixtures, homologues and analogues thereof, and the like.

In considering the several aldehydes and polypentaerythritols that may be used, the preferred embodiment of this invention comprises the reaction products of an alpha,beta-unsaturated aldehyde and a polypentaerythritol selected from dipentaerythritol and tripentaerythritol.

It is an outstanding advantage of this invention that not only do the products have unexpected physical properties but also that the processes for preparing them are simple and require no special equipment. Other outstanding advantages of this invention will appear as the description proceeds.

As the polypentaerythritols have a large number of functional hydroxy groups, it is found that no generalization can be made regarding the mole ratios of the reactants which will participate in the reaction. Thus, for example, it is found that the reaction product of dipentaerythritol and acrolein is a low molecular weight polymer ("prepolymer") in which about two dipentaerythritol molecules combine with four acrolein molecules; in the case of the reaction product of tripentaerythritol and crotonaldehyde the ratio is about 1:5. In other instances the ratios may be still higher. It is, however, another advantage of this invention that the process constantly permits maximum yields as it is found that the products are most advantageously prepared by using the aldehyde both as a reactant and as the solvent. Under such conditions the polypentaerythritol will consume the optimum amount of the unsaturated aldehyde. When the reaction is complete the excess aldehyde is recovered and used in subsequent production.

As it is advantageous to use the aldehyde as the solvent, it is preferred that the unsaturated aldehyde be selected from those that are liquid at ordinary temperatures. However, the aldehyde may also be advantageously selected from those that are solid at the reaction temperature. In those instances where the aldehyde is not a liquid or not easily liquefied during the reaction, then a common solvent is used as the reaction medium.

The combination of reaction temperature and the quantity of catalyst will govern, in general, the time for the reaction to be completed. As a rule, it may be stated that at higher temperatures and higher concentrations of catalyst the reaction times will be shorter. The converse will cause the reaction time to be longer. In establishing the reaction temperature and the quantity of catalyst which is to be used, caution should be exercised to prevent the reaction from proceeding too rapidly as the reaction mass may gel in the reaction vessel. Such damage usually results from an attempt to hasten the reaction with the result that the reaction becomes too fast and cannot be controlled. In general, the reaction is complete when a homogeneous solution results, that is to say that the polypentaerythritol is completely dissolved in the unsaturated aldehyde. If the reaction is carried substantially beyond this point, the reaction mass slowly increases in viscosity until an insoluble gel is obtained. In general, the preparation times should be short, i.e., in the order of about 4 to 5 hours.

The soluble prepolymer when formed is separated and may be used for blending with a variety of polymeric substances. The products of the prepolymer and the other polymeric substances are found to have outstanding physical properties which are more fully described hereinafter. The prepolymer may also be utilized by mixing with a small amount of an acidic catalyst, of the type described hereinafter, then poured into molds to form pottings. This same mixture may also be used to form surface coatings. Such pottings and coatings are tough, hard products which are very resistant to organic, neutral and alkaline media.

In considering the reaction temperatures, temperatures in excess of 200° C. are undesirable as there is a tendency for the reaction to proceed too rapidly even with very small quantities of catalyst. A range from about 50° C. to 200° C. is desirable but the reaction most conveniently is conducted at the reflux temperature of the aldehyde. In most instances this will range from about 50° C. to 150° C. which is the most preferred temperature range.

Any acidic catalyst of the type which is not reactive with the double bond of the aldehyde is suitable. Such catalysts include non-oxidizing mineral acids such as sulfuric and phosphoric acids, the alkane sulfonic acids such as para-toluene sulfonic acid, and the like. The concentration of the acid will vary depending upon such factors as the particular reactants, the reaction temperature, and the like. For this reason, it is difficult to make any positive statement regarding the acid concentration. However, as a generalization, it may be said that the acid concentration may be based upon the quantity of the polypentaerythritol. Thus for example, with dipentaerythritol as one of the reactants, it is found that about .015 mole of para-toluene sulfonic acid for each mole of the polyol may be required. In the case of tripentaerythritol about .06 mole of para-toluene sulfonic acid for each mole of the polyol is desirable. Amounts which are somewhat higher or lower may also be used but it is found that amounts substantially in excess of that which has been indicated will result in a product having some cross linkages. If too little is used excessively long reaction times result.

After the reaction is complete, the mass may be treated with an excess of a mild neutralizing agent such as calcium hydroxide, calcium bicarbonate and the like in order to neutralize the acid catalyst. The mixture may then be filtered with the aid of a common filter aid such as diatomaceous earth, and the like. If desired, a decolorizing agent may be used. It is an advantage of the prepolymers of this invention that they are substantially colorless although when viewed in bulk they may have a slight yellowish tint thus making the need for decolorizing usually unnecessary.

Various methods for carrying out the reaction may be employed—continuous, intermittent or batch operations being satisfactory. One method of production on a continuous scale is to feed continuously the unsaturated aldehyde, the polypentaerythritol and the catalyst into a closed, stirred mixer which is heated by any conventional means. The mixture in the reaction vessel is continuously withdrawn and fed through a reaction coil provided with a jacket through which a temperature regulating medium is circulating, the rate of flow being adjusted so as to ensure proper mixing and period of reaction. However, it is another advantage of the process that conventional reaction vessels, which are used in batch operations, may be used.

The prepolymers are found to cure readily with cellulosic containing hydroxy groups as nitrocellulose and cellulose acetate. Additionally, they are advantageously blended with materials containing active vinyl groups such as vinyl chloride, acetate resins, or hydroxy-containing vinyl resins such as the vinyl butyral resins. Similarly the prepolymers of this invention may be co-cured with other resins such as the phenol-formaldehyde resins, the aminoplasts such as urea-formaldehyde resins, melamine-formaldehyde resins, and the like. With polyvinyl alcohol the prepolymers act as reenforcing agents to increase tensile properties and improve adhesion. The prepolymers are found to be compatible in the presence of film formers such as the chlorinated rubbers, chloro-sulfonated polyethylene, polyacrylic resins and the glycidyl polyepoxides. In such combinations, the ethylenically unsaturated aldehydepolypentaerythritol prepolymers improve adhesion, increase solvent resistance, heat stability, toughness and mar resistance. In combination with vinyls they additionally act as flexibilizers as well as stabilizers to improve resistance to degradation against heat and light.

The primary application for the novel prepolymers of this invention is for blending with surface coating compositions of the type described. However, they may be used as surface coatings by themselves, as indicated above.

The following examples will illustrate methods of preparing the novel products of this invention. However, it will be understood that the examples are merely illustrative and are not intended as limitations to the appended claims.

EXAMPLE I

To a reaction vessel equipped with a reflux condenser, thermometer, agitator, heating and cooling means, and suitable inlets and outlets, are charged 5 parts of a solution of p-toluene sulfonic acid in 5 parts of water, 1420 parts of acrolein and 490 parts of dipentaerythritol. The reaction mixture is refluxed with agitation until the polyol is in solution. About three hours are required. Thereafter, with heating discontinued, 25 parts of sodium bicarbonate is added to the solution and it is agitated for an additional hour. The mixture is then filtered and stripped of excess acrolein at atmospheric pressure. A minor amount of water which settles as a separate layer is removed by vacuum. In order to insure complete removal of residual acrolein, 120 parts of toluene is added, under agitation, and the solution again stripped. The product, 805 parts, is colorless, substantially odorless and flows readily at 80° C. to 100° C. It is soluble in toluene, acetone, benzene and similar organic solvents but is insoluble in water and has the following analysis:

|  | Theory | Found |
|---|---|---|
| C | 58.2 | 58.4 |
| H | 7.9 | 7.8 |
| Br number, g./100 g | 48.5 | 48.0 |
| OH value eq./100 g | 0.30 | 0.38 |
| —C=O value eq./100 g | 0.151 | 0.192 |
| Water, Percent w | 0 | 0.74 |
| Acidity, eq./100 g | 0 | 0.004 |
| Mol. wt | 660 | ¹ 628 |

¹ Ebull. in toluene.

EXAMPLE II

To a reaction vessel equipped as in Example I there are charged with constant agitation, 350 parts of crotonaldehyde, 4 parts of a 50% aqueous solution of para-toluene sulfonic acid and 82 parts of tripentaerythritol. The resulting suspension is refluxed until substantially all the polyol is in solution. About 5 hours are required. An excess of calcium oxide, a filter aid and activated carbon are added after which the suspension is filtered to yield a clear solution. Thereafter, excess crotonaldehyde is stripped at a kettle temperature of 100° C. at 0.2 mm. to yield 805 grams of product. A sampling of the product is dissolved in toluene containing a trace of para-toluene sulfonic acid and applied to a wooden panel. Upon evaporation of the toluene there remains a thin tough film on the panel.

EXAMPLE III

The procedure of Example II is repeated using dipentaerythritol, para-toluene sulfonic acid and a large excess of crotonaldehyde. The reaction is continued until the dipentaerythritol is dissolved whereupon the product is separated in the same manner as described in Example II.

EXAMPLE IV

Into a reaction vessel equipped as in Example I are charged tripentaerythritol, para-toluene sulfonic acid and a large excess of methacrolein. The reaction mixture is refluxed with constant agitation until a clear solution results after which the solution is neutralized with calcium oxide, filtered and then stripped of the excess methacrolein. The residue is a clear resinous liquid.

EXAMPLE V

The procedure of Example I is repeated except that alpha,beta-dimethyl acrolein replaces the acrolein. The product is a clear viscous resin which forms a tough hard film on air drying for a few hours in the presence of the addition of a trace of p-toluene sulfonic acid.

As previously indicated, the products of this invention may be utilized for the production of pottings. This is illustrated by the following example.

EXAMPLE VI

A portion of the product of Example I containing a trace of p-toluene sulfonic acid is poured into a mold and heated for a few hours at 140° C. Thereafter, the temperature is raised to 172° C. and maintained at that temperature for a few more hours. Another potting is ample, the prepolymers of this invention may range from 1% to 95% of the composition. Desirably, however, they will be present in a ratio of from about 10:1 to about 1:10.

Table I will illustrate some test results using 10 grams of a 15% toluene solution of the acrolein-dipentaerythritol prepolymer of Example I blended with 2.5 grams of a 20% toluene methyl ethyl ketone solution in a ratio of 1:1 of the indicated resinous substances.

*Table 1*

| Resin | Trade name | Manufacturer | Heat resistance 115° C. for 15 min. | 10% glacial acetic acid after 72 hrs. | 15 min. in acetone | Water-resistance, 24 hr. boiler water | Scratch resistance, (knife test) | Flexibility ⅛″ mandril |
|---|---|---|---|---|---|---|---|---|
| Polyvinyl chloride | VAGH | Carbide and Carbon Corp | Slight haze | | O.K. | O.K. | Excellent | O.K. |
| Chlorinated rubber | Parlon | Hercules Powder Company | do | | O.K. | O.K. | do | O.K. |
| Polyglycidyl ethers of polyhydric phenols. | EPON 1004 | Shell Chemical Corp | do | O.K. | O.K. | O.K. | | O.K. |
| Ethyl cellulose | Ethocel | Hercules Powder Company | O.K. | O.K. | | O.K. | | |
| Urea-formaldehyde | Beetle 227-8 | American Cyanamid Co. | O.K. | O.K. | O.K. | O.K. | | |
| Phenol-formaldehyde | R-108 | General Electric Co | O.K. | O.K.[1] | O.K. | O.K. | | |
| Control acrolein-dipentaerythritol of Example I. | | | O.K. | N.G.[2] | | Fair | | |

[1] With 10% HCl instead of acetic acid.
[2] Also with 10% HCl.

similarly prepared except that it is heated only to 140° C. It has the following Barcol hardnesses:

| | R.T. | 60° C. | 80° C. | 100° C. | 120° C. |
|---|---|---|---|---|---|
| 140° C | 33 | 23 | 0 | | |
| 172° C | 38 | 30 | 32 | 15 | 4 |

Still more favorable results are obtained with faster cures when greater amounts of curing agent are used.

It is found that in order to obtain coatings having desirable characteristics, the coating composition is cured at elevated temperatures in the presence of a curing catalyst. Such catalysts are the acid-type such as phosphoric acid, oxalic acid, zinc fluoborate, butyl dihydrogen phosphate, and the like. The acid catalyst ranges from about .01 to about 5% of the total resin solids. More desirably, however, it is added in an amount about 0.1% to about 1.0%.

In order to produce surface-coatings, the resin compositions are first individually dissolved in a common hydrocarbon solvent such as benzene, toluene, xylene, pentane, and the like. The solutions thus prepared, with the catalyst added are mixed and then applied to the surface to be coated. Any conventional means such as by spraying, brushing and the like, may be used. As it is desirable to bake the coating, the solvent is removed either before baking by evaporation or by evaporation in the baking apparatus. The baking is conducted at elevated temperatures ranging from about 80° C. to about 200° C. More preferred, the temperatures should range from about 100° C. to about 150° C. The baking time will vary from about 15 minutes to 4 hours. Variation in the baking temperature and time will depend on the particular composition involved. Thus for example, where a chlorinated rubber is contained in the composition, temperatures in the order of 115° C. are preferred. In considering chlorinated compositions, it will be observed by persons skilled in the art that the use of a catalyst is not ordinarily required as the chlorine acts as the catalyst. Other observations and modifications will be readily understood but such matter are within the skill of the art.

The aldehyde-polypentaerythritol polymers preferably are blended with other polymerizable materials of the type described above in any proportion. Thus, for ex- Comparable results are obtained using other aldehyde-polypentaerythritol reaction products such as the crotonaldehyde-tripentaerythritol product of Example II, the crotonaldehyde-dipentaerythritol resin of Example III, and the other products described above.

Because of the highly improved adhesion qualities of the new compositions, they are also highly suited for bonding cotton and rayon to butyl, natural, neoprene and nitrile rubbers. Similarly, they provide excellent adhesion to glass.

We claim as our invention:
1. A product of reaction of about one mol of tripentaerythritol with 5 mols of an alpha,beta-ethylenically unsaturated alkenal containing no more than 10 carbon atoms with the aid of an acid catalyst.
2. A product obtained by reacting 2 mols of dipentaerythritol and about 4 mols of an alpha,beta-ethylenically unsaturated alkenal containing no more than 10 carbon atoms with the aid of an acid catalyst and recovering a polymer whose molecular weight corresponds to that of a molecule in which about two dipentaerythritol molecules are combined with four alkenal molecules.
3. A product as in claim 2 wherein the alkenal is acrolein.
4. A product as in claim 2 wherein the alkenal is crotonaldehyde.

References Cited in the file of this patent

UNITED STATES PATENTS

| 2,401,776 | Rothrock | June 11, 1946 |
| 2,643,236 | Kropa | June 23, 1953 |

FOREIGN PATENTS

| 868,351 | Germany | Feb. 23, 1953 |
| 870,032 | Germany | Mar. 9, 1953 |

OTHER REFERENCES

Wyler: Ind. & Eng. Chem., Anal. Ed., vol. 18, 1946, pp. 777–778. (Copy in Div. 69.)

Schulz et al.: Angewandte Chemie, vol. 62, No. 5, 1950, pp. 105, 113, 114, 117 and 118. (Copy in Scientific Library.)